Patented Jan. 13, 1953

2,625,490

UNITED STATES PATENT OFFICE 2,625,490

SOLUTIONS OF PROTEINS AND THEIR PREPARATION

John R. Caldwell, Kingsport, Tenn., assignor to Eastman Kodak Company, Rochester, N. Y., a corporation of New Jersey No Drawing. Application April 20, 1949, Serial No. 88,683

5 Claims. (Cl. 106—153)

This application relates to solutions of proteins prepared by dissolving the proteins in sodium salts of lower molecular weight aromatic sulfonic acids and the method of preparing those solutions.

It has been recognized in the prior art that some types of organic sulfates or sulfonates have been suitable for dissolving proteins. These organic sulfur compounds, however, have been of high molecular weight and technical difficulty has been experienced with those compounds due to the foaming exhibited thereby when those compounds in aqueous solution were agitated or filtered. Also, those high molecular weight sulfonic acid compounds have been difficult to recover from dilute solutions by evaporation because when in concentrated form, they give viscous solutions which have been difficult to handle. The prior art contains many references to the preparation of protein dispersions in aqueous alkalis, such as 2–5% sodium hydroxide solutions, solutions of amines, etc. Solutions of proteins in aqueous alkalis, however, are ordinarily unstable and undergo rapid changes in viscosity, clarity, etc. In most cases solutions of proteins in aqueous alkalis must be used within 15–20 hours of mixing because of the hydrolysis and degradation of the protein molecule which is caused by the alkali which is present.

One object of my invention is to provide a method for preparing solutions or dispersions of proteins which can be used in the manufacture of fibers, films, or other elongated products. Another object of my invention is to provide a method for dissolving or peptizing proteins without causing excessive degradation of the molecule. A further object of my invention is to provide a protein dispersion which is not particularly susceptible to foaming and may be readily handled. A still further object of my invention is to provide a protein dispersion that is stable to storage over a relatively long period of time. Other objects of my invention will appear herein.

The objects of my invention are accomplished by dissolving or peptizing the protein in an aqueous solution of an aromatic sulfonic acid salt of 6–8 carbon atoms, the concentration of the solution being 20–40%. I have found that a wide variety of proteins can be dissolved by such solutions when of the proper concentration. This method of dissolving proteins is especially useful for obtaining solutions of the globular proteins derived from vegetable seeds, such as soybean protein, peanut protein, cottonseed protein, and hempseed protein. However, the process of my invention can also be employed to obtain solutions or dispersions of proteins from other classes. Some other proteins which may be dissolved by the process in accordance with my invention are casein, egg albumin, zein, wheat glutin, and alfalfa protein. The process of my invention may also be applied to fibrous or keratin proteins as represented by the feathers of fowl, such as chickens, ducks, etc., or of the hair of animals. The solutions or dopes of proteins as prepared by this invention are useful in the manufacture of extruded articles, such as fibers, sheets, tubes and the like. These solutions are also useful for the coating or impregnating of paper and for textile products.

The aromatic sulfonic acids whose salts are employed in the present invention are benzene sulfonic acid, toluene sulfonic acid, xylene sulfonic acid, and ethyl benzene sulfonic acid. The use of certain types of aromatic sulfonic acid salts as dispersing agents has been disclosed in the prior art. For instance, U. S. Patent No. 2,403,251 of Watson describes the use of the salts of aromatic sulfonic acids but that patent points out that those compounds should contain at least three carbon atoms in the aliphatic chain attached to the ring and that compounds of less carbon atom content are ineffective. To the same effect is the disclosure in U. S. Patent No. 2,459,708 wherein the alkyl groups present in the sulfonates used all have a carbon atom content of at least 3. I have found, however, that the aromatic sulfonic acids in which the aliphatic chains are from 0 to 2 carbons when employed in a concentration of 20–40% in the form of their sodium or potassium salts in water are very effective in dispersing proteins and that solutions are obtained thereby which are stable and are useful for the preparation of elongated products therefrom. These alkali metal salts of aromatic sulfonic acids are relatively free of foaming and are readily recovered from dilute solutions thereof by evaporation. Also, the proteins which are dissolved therein may be readily coagulated by extrusion of those solutions into water whereby the concentration of the alkali metal sulfonate becomes so small that coagulation occurs. In many instances, however, other coagulating baths are also useful for this purpose.

The proteins which are used in my process are those which have been purified by the usual procedures known for the types of proteins used. For instance, soybean protein prepared by the method described in Industrial and Engineering Chemistry, vol. 36, page 799 (1944) may be employed as the starting material. Either the dried protein or the wet pressed cake can be dissolved in the aromatic sulfonic acid salt solutions in accordance with my invention providing the sulfonic acid concentration is maintained between 20 and 40%. Peanut protein extruded by the process described in Chemical and Engineering News, vol. 24, page 478 (1946) is also suitable for use as a starting material in accordance with my invention. The solutions are preferably prepared by dissolving the protein in the salt solution accomplished by mixing at a temperature of 25–60° C. A clear viscous dope or solution is obtained thereby which solution after cooling shows no tendency to gel. The concentration of the protein dissolved in the dope depends on the viscosity desired and the nature of the specific protein being used. For most purposes solutions containing 10–30% of protein are most satisfactory. In the dissolving of feathers it is desirable that an addition be made of a reducing agent, such as mercaptoethanol or sodium bisulfite, to the salt solution. 2–5% of the reducing agent is ordinarily satisfactory. Upon heating the keratinous material, such as feathers, in this solution at 70–90° C. for several hours about 60–80% of the material goes into solution.

The following examples illustrate my invention:

*Example 1.*—30 parts of sodium toluene sulfonate was dissolved in 70 parts of water so as to form a clear solution. 15 parts of finely powdered zein was added and the mixture was stirred at 50–55° C. for three hours. A clear, viscous dope was produced. The dope showed no appreciable change in viscosity after standing for eight days. This solution of zein was then coated onto glass plates and immersed in a coagulating solution containing 100 g. of sodium toluene sulfonate and 20 g. of toluene sulfonic acid per liter. A tough film was produced which could be gelled readily from the plate. The solution of zein was also found to be useful for the production of artificial leather by impregnating cloth or paper products therewith.

*Example 2.*—A 35% solution of sodium toluene sulfonate in water was prepared. 20 parts of this solution was stirred with 5 parts of casein at 50–60° C. for several hours thereby producing a clear, viscous solution of the protein. 0.1 part of mercaptoethanol was also added. The solution showed no change in appearance or viscosity when allowed to stand for 8–10 days. The solution was filtered and pumped through a spinnerette into a coagulating bath consisting of 20% sodium sulfate, 10% sulfuric acid, 5% of glucose, and 5% of aluminum sulfate, the rest being water. The fibers were wound on metal bobbins and treated with formaldehyde for hardening purposes. Strong, elastic fibers were produced.

*Example 3.*—20 parts of refined soybean protein were added to 100 parts of a 40% aqueous solution of sodium benzene sulfonate. ½ part of mercaptoethanol was also added. The solution was allowed to stand for 6–8 days and was found to be stable over that period. It was then spun in the same manner as described in the preceding example. Fibers of good quality were obtained.

*Example 4.*—10 parts of washed chicken feathers were cut into pieces approximately ¼" x ½". The feathers were then stirred into a solution containing 40 parts of sodium toluene sulfonate, 0.5 parts of mercaptoethanol and 60 parts of water. The mass was kept at a temperature of 60–70° C. for six hours and about 80% of the feathers had dissolved. The insoluble material was filtered off, and the clear solution was spun into a coagulating bath as described in Example 2, resulting in fibers of good quality.

I claim:

1. A solution of a protein in water containing, in a concentration of 20–40%, sodium toluene sulfonate.

2. A solution of zein in water containing, in 20–40% concentration, sodium toluene sulfonate.

3. A method of dissolving zein which comprises mixing the zein at a temperature of at least 25° C. and below the boiling point of water with an aqueous solution of sodium toluene sulfonate in 20–40% concentration therein.

4. A solution of soybean protein in water containing, in a concentration of 20–40 percent, sodium toluene sulfonate.

5. A method of dissolving soybean protein which comprises mixing the protein at a temperature of at least 25° F., and below the boiling point of water, with an aqueous solution of sodium toluene sulfonate in 20–40 percent concentration therein.

JOHN R. CALDWELL.

REFERENCES CITED

The following references are of record in the file of this patent:

UNITED STATES PATENTS

| Number | Name | Date |
|---|---|---|
| 2,396,752 | Roddy | Mar. 19, 1946 |
| 2,403,251 | Watson | July 2, 1946 |
| 2,459,708 | Lundgren | Jan. 19, 1949 |
| 2,496,546 | Calhoun et al. | May 10, 1949 |